United States Patent
Gray et al.

(10) Patent No.: US 10,956,396 B2
(45) Date of Patent: *Mar. 23, 2021

(54) SYSTEM AND METHOD FOR IMPROVED DATA CONSISTENCY IN DATA SYSTEMS INCLUDING DEPENDENT ALGORITHMS

(71) Applicant: Level 3 Communications, LLC, Broomfield, CO (US)

(72) Inventors: William Gray, Boulder, CO (US); Binchao Chen, Broomfield, CO (US); Steven D. Meyer, Arvada, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,382

(22) Filed: Nov. 7, 2019

(65) Prior Publication Data

US 2020/0073861 A1    Mar. 5, 2020

Related U.S. Application Data

(63) Continuation of application No. 15/652,897, filed on Jul. 18, 2017, now Pat. No. 10,474,663.

(60) Provisional application No. 62/458,264, filed on Feb. 13, 2017, provisional application No. 62/364,617, filed on Jul. 20, 2016.

(51) Int. Cl.
*G06F 16/23* (2019.01)
*G06F 16/22* (2019.01)

(52) U.S. Cl.
CPC .............. *G06F 16/23* (2019.01); *G06F 16/22* (2019.01)

(58) Field of Classification Search
CPC ...................................................... G06F 16/23
USPC ........................................................ 707/803
See application file for complete search history.

(56) References Cited

U.S. PATENT DOCUMENTS

| 8,832,657 | B1 | 9/2014 | Cowan | |
| 2007/0074177 | A1* | 3/2007 | Kurita | G06F 8/75 717/131 |
| 2012/0254842 | A1* | 10/2012 | Henderson | G06F 8/76 717/136 |
| 2017/0308574 | A1 | 10/2017 | Kim | |
| 2018/0025041 | A1 | 1/2018 | Gray et al. | |

* cited by examiner

*Primary Examiner* — Baoquoc N To

(57) ABSTRACT

A data system is provided for analyzing and maintaining data obtained from one or more data sources on which the data system depends. The system includes a primary database including current values used by the system and a collection of executable algorithms used to generate the data maintained in the primary database. In response to receiving a notification regarding a change in one of the data sources, a dependency database is used to establish an execution order for algorithms of the algorithm collection that are directly or indirectly dependent on the changed data. The algorithms identified in the execution order are then executed in accordance with the execution order and the corresponding result is stored in the primary database. The system may include data harvesters adapted to recognize changes in the data sources and to generate and transmit corresponding change notifications when such changes occur.

22 Claims, 5 Drawing Sheets

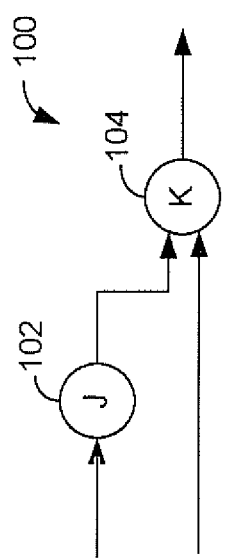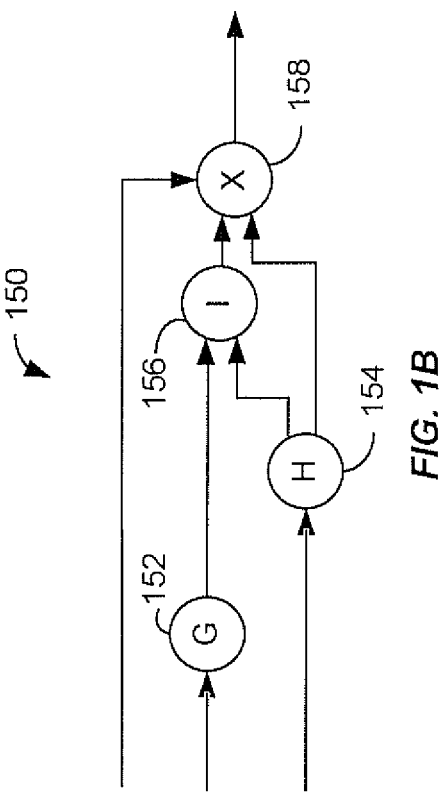
FIG. 1A
FIG. 1B

SYSTEM AND METHOD FOR IMPROVED DATA CONSISTENCY IN DATA SYSTEMS INCLUDING DEPENDENT ALGORITHMS

CROSS-REFERENCE TO RELATED APPLICATIONS

This application is a continuation of and claims the benefit of priority from U.S. patent application Ser. No. 15/652,897, filed Jul. 18, 2017, now U.S. Pat. No. 10,474,663, which claims priority under 35 U.S.C. § 119(e) from U.S. Provisional Patent Application No. 62/364,617, filed Jul. 20, 2016, and from U.S. Provisional Patent Application No. 62/458,264, filed Feb. 13, 2017, entitled "SYSTEM AND METHOD FOR IMPROVED DATA CONSISTENCY IN DATA SYSTEMS INCLUDING DEPENDENT ALGORITHMS," the entire contents of each of which are incorporated herein by reference for all purposes.

TECHNICAL FIELD

Improving data consistency in data systems implementing hierarchical data processing, including, but not limited to, data systems for real-time scoring of customers and business opportunities.

BACKGROUND

Prioritizing resources within a company requires balancing past performance with future opportunities. For example, companies have to budget resources for sales, marketing, R&D, engineering, etc., and, within those departments, must decide what people and resources will be assigned to particular projects and/or customers. Although companies often use data to allocate resources, many opportunities are not realized because the opportunities are insufficiently prioritized or understood. One reason for this is that human beings often struggle to simultaneously evaluate and process multiple layers of information. Moreover, scoring and evaluating data in real-time quickly becomes something human beings are incapable of due to both the complexity of the evaluation and the speed required for generating a result within a useful timeframe. Finally, even if the data is understood, it often is too complex to be useful for decision making.

It is with these observations in mind, among others, that various aspects of the present disclosure were conceived and developed.

SUMMARY

Systems and methods in accordance with the present disclosure are generally directed to data processing systems for retrieving and analyzing large quantities of data, such as, but not limited to consumer or business data obtained from third-party data vendors.

In one implementation, a method of updating and analyzing data of a data system is provided. The method includes receiving a change notification indicating a change to a field data of a data source on which the data system relies. In response to the notification, a database (referred to herein as a "tier 1" database) used to store current data used by the data system is updated to reflect the changed value. In addition to updating the tier 1 database, algorithms of an algorithm collection that are dependent (either directly or indirectly) on the changed data are identified. The process of identifying the algorithms includes generating an execution order that specifies the order in which the algorithms are to be executed in order to maintain data consistency within the system. The algorithms are then executed in accordance with the execution order and the corresponding results are stored in the tier 1 database.

The dependency data is stored in a dependency database, which may be implemented as a graph database. Accordingly, certain implementations may include creating a dependency graph or database. The dependency database generally describes the dependencies between the algorithms of the algorithm collection and the relationship between input and outputs of the algorithms included in the dependency database. The dependency database may be used for generating a processing or execution order for the algorithms based on the dependency information contained therein. For example, in certain embodiments, generating a processing or execution order may first include identifying algorithms dependent on changed data and then traversing the dependency database to identify other algorithms that are indirectly dependent on the changed data. The identified algorithms may then be executed according to the execution order such that data consistency is preserved.

In another implementation, a system for organizing and analyzing data from multiple data sources is provided. The system includes an algorithm collection including a plurality of executable algorithms for evaluating data, a first database including dependency data for each algorithm of the plurality of algorithms and at least one computing device. The computing device is configured to receive notifications corresponding to changed data of data sources and, in response, execute one or more of the algorithms dependent on the changed data according to the dependency data maintained in the first database. The computing device may then update data stored in a second database to include the changed data and/or the results of algorithms dependent on the changed data.

In certain embodiments, the at least one computing device receives notifications from data harvesting applications that are in communication with the data sources. The data harvesters identify changes in the data sources and generate notifications including normalized data obtained from the data source.

In other embodiments, the server may also be adapted to receive an execution plan that includes an execution order for the algorithms dependent on the changed data and to execute the algorithms according to the execution order. For example, in certain embodiments, the server may generate and transmit a request for an execution plan to an application in communication with the first database and to receive the execution plan in response to the request.

In yet another implementation, a system for organizing and analyzing data from multiple data sources is provided. The system includes an algorithm collection including executable algorithms and a dependency database that includes dependency data for each algorithm of the algorithm collection, the dependency data indicating data relationships between algorithms of the algorithm collection. The system further includes a current database for storing current values of data stored in one or more data sources and results of algorithms of the algorithm collection. The system also includes one or more computing devices communicatively coupled to the algorithm collection, the dependency database, and the current database. The computing devices are configured to recognize changes to data of the data sources, to identify algorithms of the algorithm collection either directly or indirectly dependent on the changed data and to generate execution orders using the dependency data.

The computing devices are further configured to generate algorithm results by executing the identified algorithms according to the execution order and updating the current database with the algorithm results.

BRIEF DESCRIPTION OF THE DRAWINGS

FIGS. 1A-B are example dependency graphs illustrating dependencies between algorithms.

DETAILED DESCRIPTION

Figure 2:
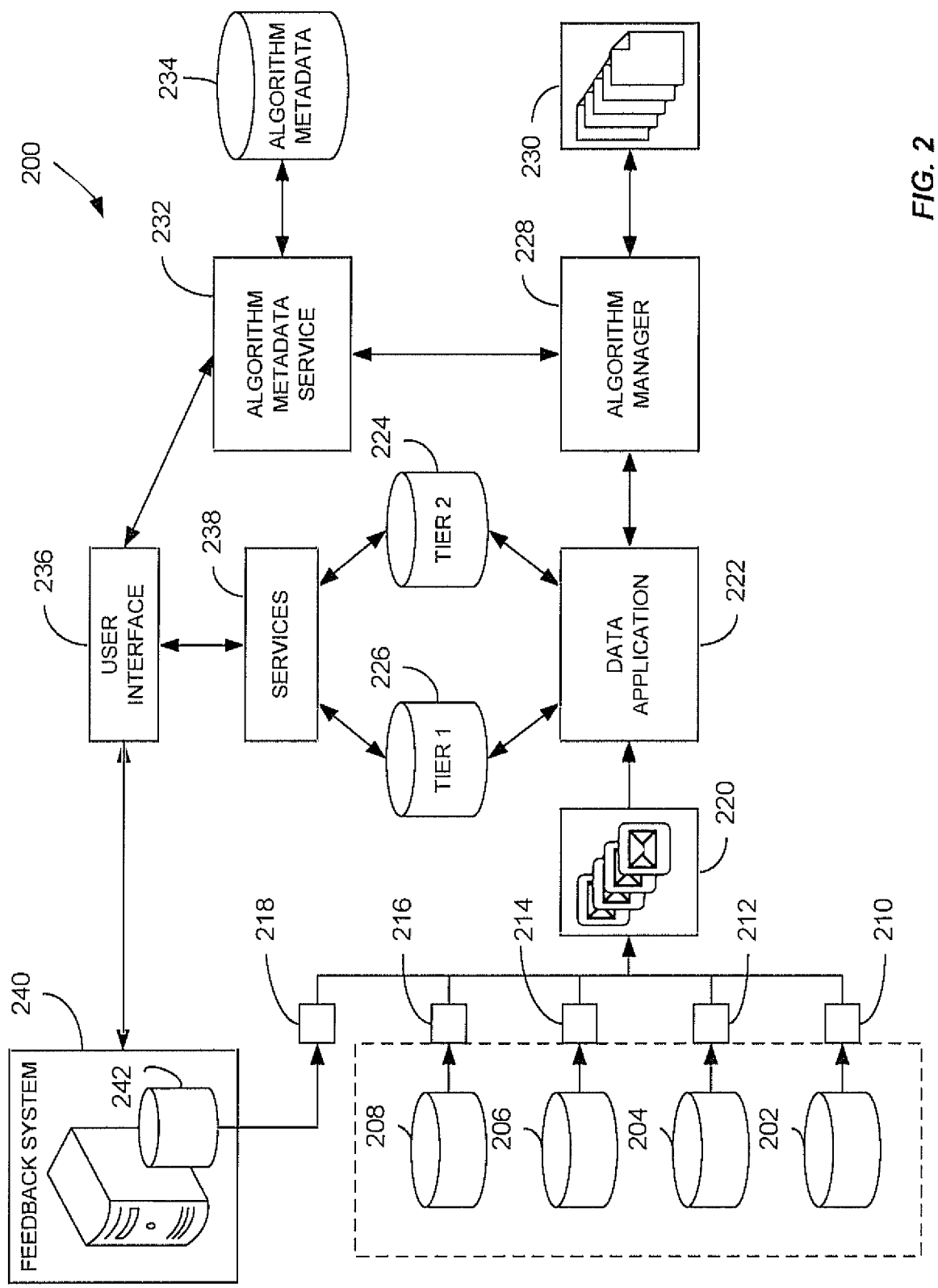
FIG. 2 is a schematic illustration of a data system in accordance with the present disclosure.

Described herein are systems and methods which allow for improvement in evaluating data in real-time. Such data evaluation techniques may be used in, but are not limited to, the evaluation of customers and business opportunities.

Systems and methods in accordance with this disclosure rely on data stored within one or more data sources. Each data source includes data fields within which corresponding data values are stored and which may be used by the system to evaluate how best to allocate business resources. In certain implementations, for example, the stored data corresponds to existing and/or potential customers and the evaluation determines the potential benefits of pursuing new business opportunities with corresponding customers.

Several technical features of implementations disclosed herein enable such analysis to be conducted with improved speed and efficiency as compared to known systems while ensuring data integrity and consistency. Data analysis, including analysis of business data for purposes of identifying business opportunities, involves aggregating large amounts of data and performing many calculations and analyses on the aggregated data. The amount of data and complexity of calculations makes timely manual analysis by humans inefficient to the point of practical impossibility and, as a result, computing systems are routinely implemented for collecting, processing, and analyzing relevant data.

Known data analysis systems generally import large quantities of bulk data from remote data sources and then analyze the imported data using a predetermined suite of routines and algorithms. Many known systems suffer from various inefficiencies. For example, known systems often require that all data from a particular source be imported even if only a portion of the data is relevant to the data analysis being performed. Moreover, even if known systems filter irrelevant data, all relevant data is often imported despite the fact that only a small portion of the relevant data may have been modified since the most recent importation. As a result, the process of importing data in known systems generally make inefficient use of network bandwidth and computational resources used for data importation, resulting in increased power consumption, computational time, and costs. Moreover, even after data importation, known systems generally require that the full suite of routines and algorithms used in analyzing the data be executed instead of just the routines and algorithms affected by changes to the underlying data. Again, this leads to inefficient use of computation resources and subsequent increases in power consumption, wasted computational time, and related costs.

Known data systems are also generally unable to provide real-time updates due to the time and computational resources required for updating data. More specifically, such updates are generally only run periodically (e.g., every few days) and during off-peak times (e.g., overnight). As a result, the accuracy of data used in known systems is limited by the frequency with which it is updated, and employees, such as sales team members, are often required to rely on stale data when evaluating business decisions.

In contrast to known systems, the methods and systems according to the present disclosure are realized by, among other things, limiting the quantity and frequency of data retrieved from external data sources and limiting the computations performed against such data to only those which are necessary to reflect additions or changes in the imported data. These advantages are achieved, in part, by implementing data harvesting applications adapted to monitor and communicate only relevant changes to data sources to a data handling system for processing and by maintaining a database of current values used in the evaluations performed by the system. To reduce computational workload, the system further includes a collection of algorithms and dependency data for the algorithms such that when a data change is identified by one of the data harvesting applications, only those algorithms that are dependent on the changed data may be identified and executed to update the values maintained in the database. Accordingly, as compared to known systems, systems according to the present disclosure require, among other things, less bandwidth when importing data and less computational power to ensure that any changes to relevant data are propagated through the system. Moreover, the system may employ a faster and smaller database, optimizing access and costs related to processing the high value data. As a result, systems according to the present disclosure reduce bandwidth, power consumption, and overall costs in operating a data analysis system and improve the speed at which data within such systems is updated, thereby enabling employees to have access to accurate and up-to-date data from which they can make informed business decisions.

In implementations of the present disclosure, a collection of algorithms may be maintained and used to perform various calculations and evaluations using data available to the system. Such data may include data stored within the one or more data sources and retrieved using corresponding data harvesters, but may also include results from executing algorithms of the algorithm collection. In certain implementations, the values of data fields used by and/or generated by algorithms of the algorithm collection may be stored within one or more "tier 1" databases for ease and speed of access. For example, the tier 1 database may store data retrieved from the one or more data sources, results of algorithms of the algorithm collection, and current "scores" or other similar evaluation metrics produced by executing algorithms of the algorithm collection. By storing such data in the tier 1 database, the data can be accessed by the system without having to unnecessarily retrieve the data from the data sources or re-execute corresponding algorithms of the algorithm collection. For example, an inquiry into the strength of a potential business opportunity may simply include performing a lookup or similar basic operation on the tier 1 database for a previously generated score as opposed to a more time- and resource-intensive process including importing data from a data source and/or performing a series of calculations.

By implementing the tier 1 database, a change in data of a data source may be efficiently propagated through the system. More specifically, in response to receiving a notification including changed data of a data source from a data harvester, the system identifies and re-executes only those algorithms that are directly or indirectly dependent on the changed data. To the extent such algorithms are also dependent on other data (whether from a data source or a result of a second algorithm independent of the changed data), the other data may be retrieved from the tier 1 database. Accordingly, only the minimum set of algorithms are required to be executed by the system, reducing the computational workload associated with propagating the change through the system and the time required for making the updated data available for use.

As previously discussed, execution of algorithms of the algorithm collection may result in the generation of a score or similar metric associated with a particular business opportunity, customer, etc. The score could, for example, be a grade based on the weighted outputs of some or all of the algorithms such that the score reflects a weighted sum of the scores or outputs for each algorithm. Such scores can then be simplified even further, to letter grades or even binary (e.g., pass/fail) grades. If, for example, an option ranked highly in multiple categories, the system could provide an "A" or an "A–" score, whereas if the analyses indicated that an option was average or mediocre in multiple categories, the option or might receive a "C" or "D" score.

Letter scores are just one way of scoring options and opportunities. Number rankings, such as "1 to 10" or "1 to 100", "good or bad", or any other ranking system, are similarly possible. More generally, the score is intended to provide an overall evaluation of an option condensed down to a single point of evaluation, such as, but not limited to, a letter or number score. Scoring of a particular option may be facilitated by the use of tables, weighting systems, equations, and/or any other mechanisms from which a score may be determined from multiple data points (which may be, among other things, outputs of algorithms or data obtained from the one or more data sources).

Data consistency is often a critical aspect of complex data evaluation systems. More particularly, such systems may perform evaluations that rely on algorithms that depend on the results of other algorithms. As a result, when data is modified within such systems, ensuring data consistency may require certain algorithms to be executed in a particular order. For example, the output of a first algorithm may be used as input for a second algorithm, such that the second algorithm is dependent on the first algorithm. FIG. 1A is a first dependency graph 100 illustrating such a relationship. More particularly, a first algorithm 102 (algorithm "J") is used as input for a second algorithm 102 (algorithm "K"), where both J and K further rely on "original" data (such as data obtained directly from the one or more data sources). FIG. 1B illustrates a second dependency graph 150 including more complex interdependencies between algorithms. The second dependency graph 150 includes a first algorithm 152 (algorithm "G"), a second algorithm 154 (algorithm "H"), a third algorithm 156 (algorithm "I"), and a fourth algorithm (algorithm "X") that have a hierarchical structure in which algorithm 1156 relies on outputs from each of algorithm G 152 and algorithm H 154, and algorithm X 158 relies on output from each of algorithms H 154 and I 156. Each of algorithm G 152, algorithm H 154, and algorithm X 158 also rely on original data. In light of the dependencies between the algorithms 152-158, execution of algorithm X 158 requires that algorithms G 152, H 154, and 1156 be previously executed in order. Specifically, while algorithm G 152 and algorithm H 154 may be executed in any order (including in parallel), each of algorithm G 152 and algorithm H 154 must be executed prior to execution of algorithm 1156, which in turn must be executed prior to execution of algorithm X 158.

The dependency relationships illustrated in FIGS. 1A and 1B result in a substantially linear flow of data between the algorithms such that each algorithm depends only on outputs produced by "upstream" algorithms. However, relationships between algorithms may also be circular or recursive. For example, a first algorithm may be dependent on the output of a second algorithm that is also dependent on the output of the first algorithm. In such instances, a change to an input of either the first algorithm or the second algorithm may result in repeated execution of the algorithms as their outputs are continuously updated. To address the possibility of such a loop occurring infinitely, the outputs of recursive algorithms may be considered final when, among other things, a predetermined number of loop executions have occurred or the algorithm outputs sufficiently converge on a particular value, such as when the change in the outputs between subsequent executions of the algorithms fall below a predetermined threshold.

In light of these types of data consistency issues, systems and methods in accordance with this disclosure rely on a dependency graph that establishes relationships between algorithms of the algorithm collection. In certain implementations, for example, the algorithm collection is maintained as a graph database in which each node represents an algorithm of the algorithm collection and each branch represents a dependency between algorithms. Accordingly, when data relied upon by the system changes, a processing or execution order may be established by traversing the algorithm collection starting at nodes corresponding to algorithms that rely directly on the changed data. The generated processing order, which may be implemented as an execution plan executable by the system, preserves data consistency by ensuring that an algorithm is executed only after all algorithms on which the algorithm depends have been executed. For example, a first algorithm that uses the output of one or more second algorithms as inputs will generally be placed within the processing order and execution plan such that it is executed after the one or more second algorithms. Notably, the execution plan generally includes only those algorithms of the algorithm collection that are either directly or indirectly dependent on the changed data and, therefore, represents the minimum set of algorithms required to be executed in order to propagate changed data through the system. To the extent algorithms of the execution plan require additional data, such data can be readily retrieved from a database of current values, such as the tier 1 database without performing any additional calculations or executing any additional algorithms. As a result, changes to data relied upon by the system can be propagated through the system with a minimal amount of computational resources and time.

As previously noted, systems in accordance with this disclosure may be used to generate a score or other metric for evaluating options, such as business opportunities, based on the data available to the system. Such evaluations may be presented to a user through a user interface including, without limitation, a program executable by a user computing device, a web portal accessible through a web browser, or any similar software for retrieving and presenting data to a user. In certain implementations, the user interface may also present information regarding the underlying methodology for calculating a score or allow a user to generate or modify such methodologies. For example, a user may modify weights assigned to different algorithm results or data values corresponding to metrics or predictors used in generating a score. In the context of evaluating business opportunities, such metrics may include, but are not limited to, churn prediction, ease to capture, potential profit, scope of product needs, and scores for specific products. In addition to relying on direct input from a user, the system may also be configured to modify the evaluation process based on characteristics of the business being evaluated. For example, the system may modify the metrics considered and their relative weightings based on, among other things, the type of organization being evaluated, the size of the organization, specific needs or considerations of the user, and the processing power required to perform underlying calculations.

The user interface may also allow a user to provide feedback values corresponding to data used in performing a particular evaluation. For example, a user may notice that the system is relying on outdated data regarding the employee count of a particular customer. The user may then use the user interface to provide an updated employee count value that is then processed by the system. Similar to changes identified in data stored in the data sources, such processing may generally include storing the feedback value and identifying and executing only those algorithms that are dependent on the feedback value. Accordingly, propagating user feedback through the system is also achieved in a rapid manner that preserves computational resources.

Referring to the type of entity, for example, the entity type may be, but is not limited to, one of an individual customer, a potential client, or a business opportunity. In one implementation, the entity may be an individual customer of a grocery store implementing a system in accordance with this disclosure. In such an implementation, the data evaluated by the system may include, without limitation, grocery items purchased by the customer, coupons used by the customer, the time of day (or day of week) of the customer's shopping experiences, which register was used for one or more transactions, brand preferences of the customer, and amounts of goods purchased during one or more transactions. In the case of customers who are companies or business opportunities, the data may include, without limitation, a size of the company, past buying behavior of the company, current services provided to the company, competitors of the company, and a quantification of manpower interactions with the company (such as the number of hours spent dealing with the customer on a weekly basis).

As previously noted, the underlying data required for evaluations and scoring may be obtained or otherwise received from one or more data sources, each data source providing a respective portion of the underlying data. To facilitate retrieval of data from the data sources, harvester applications or modules may be implemented to harvest specific points of data from respective data sources. Each data harvester may monitor or otherwise receive notifications of new or modified data in a corresponding data source and, when such changes occur, initiate propagation of the changes through the system. For example, the harvesters may be configured to generate notification messages including the changed data and to transmit such notifications to a central module or application of the system that then handles the notification accordingly. By generating and transmitting notifications in response to new or updated data, the data harvesters reduce the frequency and amount of data that is imported from the data sources and eliminates unnecessary importation and processing of unchanged data, thereby conserving network bandwidth and computational resources and improving the speed at which changes to the data sources are propagated through the system. Handling the notification may include, among other things, coordinating the generation and execution of an execution plan that re-runs any algorithms that are dependent (directly or indirectly) on the changed data in an order that maintains data consistency and updating any corresponding entries maintained in the tier 1 database. In certain implementations, updates to the data sources and, more specifically, corresponding change notifications may be received in real-time, effectively causing the system to re-execute any algorithms relying on the changed data in real-time. Accordingly, if a score or similar metric for a particular option or opportunity is maintained by the system, the score will also be updated in real-time to reflect the updated data.

In certain implementations, the tier 1 database or portions thereof may also be cached to further facilitate ease and speed of access to the data maintained therein. Such caches may be configured to store important or frequently accessed data of the tier 1 database in a more readily accessible location or format or on a higher performance data storage system to improve access speeds. In certain implementations, caches may be used to store portions of the tier 1 database for use by particular departments or business units within an organization. Accordingly, each cache may include data of the tier 1 database that is particularly relevant or otherwise frequently accessed by a respective unit of the organization. Implementation of such caches generally improves responsiveness to requests received from users for data that would otherwise be retrieved from the tier 1 database and reduces the overall load placed on the tier 1 database. To the extent a cache is maintained locally relative to the primary users of the cache, caching may also reduce network traffic and associated costs for retrieving the data.

Scores and other evaluations generated by systems described herein may be displayed or otherwise provided to a user via a graphical user interface, email, text message, and/or any other communication mechanism. The user may also be provided with the underlying data or results of algorithms relied upon in calculating the score. For example, if the score of a business opportunity or customer suddenly drops because a particular algorithm generated an output indicating sub-par performance, the score email sent to the user may include the updated score with an explanation that the score dropped as a result of a particular factor used in the scoring process. In such circumstances, the entity could also be flagged or otherwise noted as not performing well, and the flag can likewise be communicated to the user via email, text, or a notification on the graphical user interface.

The system may use any number of algorithms to determine the score of a particular option or opportunity. In one example, a customer may be evaluated based on a number of received complaint tickets originating from the customer. Such an evaluation may include algorithms directed to one or more of aggregating actual complaint ticket data from one or more data sources, generating a predicted number of complaint tickets based on mathematical models, and producing a score based on one or more of an absolute number of complaint tickets received from the customer, a predicted number of complaint tickets, and a comparison between the absolute and predicted number of complaint tickets. The predicted number of complaint tickets may further include executing of one or more algorithms that model customer complaint activity based on historical customer data, the size of the customer, the type of products/services being provided to the customer, the behavior of similar customers, and other factors. During operation, the evaluation may be executed an initial time and the results of each algorithm involved may be stored in a database, such as the tier 1 database. If the system subsequently receives a notification that any data upon which the algorithms used to produce the actual or predicted number of complaint tickets has changed, the system may re-execute only those algorithms required to perform the specific complaint ticket analysis. In certain implementations, evaluations may be based on changes in scores, data, or metrics derived from such data over time. So, for example, the foregoing evaluation may consider changes in the number of received customer complaint tickets over time or changes in the overall score assigned to the customer.

The system may be configured to generate a notification when the results of an evaluation exceed or fall below a predetermined threshold or value. In the context of complaint tickets, for example, a notification may be generated when the actual number of complaint tickets received from a customer exceeds the predicted number of tickets by more than a predetermined amount, such as 1.5 standard deviations from the predicted amount. A similar notification could be produced when the number of tickets issued is less than 1.5 standard deviations from the predicted amount. The use of 1.5 standard deviations is exemplary only—the threshold variance can vary from circumstance to circumstance and configuration to configuration, and need not be based on standard deviation. Any threshold difference from a predicted value can be used to identify outliers. In addition, this data can be used to identify trends over predetermined durations of time (days, weeks, months, etc.).

In certain implementations, some or all of the algorithms of the algorithm collection used to evaluate an option or opportunity may be proprietary and may not be directly modified by a user of the system. In other implementations, the algorithms may be created or modified by a user of the system based on their particular needs. In either case, changes to the algorithm collection or one or more algorithms may cause the system to re-execute the modified algorithms and any algorithms depending therefrom. More specifically, in response to adding a new algorithm into the algorithm collection or modifying an existing algorithm of the algorithm collection, the system may generate an execution plan in which the new/modified algorithm and any algorithms depending therefrom are executed in an order that preserves data consistency.

In summary, systems and methods according to the present disclosure facilitate efficient analysis of large quantities of data for use in various applications, such as analysis of business opportunities. The quantity of data and calculations required for such analyses lead to significant inefficiencies in known systems, which generally retrieve all relevant data and execute a full suite of algorithms required by the analysis. In contrast, systems disclosed herein include a unique architecture that enable a faster and more efficient approach in which only changed data is imported and only algorithms dependent on changed data are executed. More specifically, the implementation of data harvesters that monitor and report changes in data sources relied upon by the system and the maintenance of a central tier 1 database ensures that only changed data is imported into the system. Further, the use of an algorithm collection and dependency data regarding the algorithms of the collection enables the generation of an execution plan for propagating changes through the system in which only algorithms dependent on changed data are included. By doing so, the amount of data imported into the system and the quantity of algorithms executed to evaluate such data are optimized, reducing the computational workload, network bandwidth, time, and overall costs associated with maintaining the data system.

As an example of use of methods and systems disclosed herein, suppose Company A (or, more specifically, a sales employee of Company A) wishes to evaluate the relative strength of pursuing business opportunities with Company X, who is an existing customer of Company A. One or more data harvesters may be implemented by Company A to retrieve, normalize, and process data regarding company X, such as sales figures, number of billing disputes, cost of resolving billing disputes, and types of products sold, that has been collected in data sources maintained by Company A. Company A may also wish to use additional data from external sources to evaluate Company X. To do so, Company A may implement additional data harvesters to retrieve and process data from external data sources such as those operated by SALESFORCE, LINKEDIN, DATA.COM, DUN & BRADSTREET, OCEAN INFORMATICS, and similar data vendors. The additional data harvesters may obtain additional data about Company X, thereby allowing Company A to build a large amount of reference data about Company X. Such reference data may include, but is not limited to, customer/target firmographics, current services, competitor building lists, intent data, buying behaviors, and other data with which Company A may evaluate Company X.

The system of Company A includes or otherwise has access to a collection of algorithms that may be used to evaluate Company X. The algorithm collection may include proprietary algorithms purchased or otherwise acquired from third-parties as well as custom algorithms developed by Company A. In general, each algorithm of the algorithm collection requires input which may be data values from the data sources accessible to Company A or the results of other algorithms of the algorithm collection. Such algorithms may include those used to determine, without limitation, one or more of a churn prediction, ease to capture, potential profit, a tier 3 sweet spot, total spending, specific product scores, and scope of product needs. As a preliminary step, Company A may retrieve, via the data harvesters, an initial set of data from the data sources to at least partially populate a database of current data values, also referred to herein as a "tier 1" database. After initial data collection, an evaluation of Company X may be initiated in which algorithms of the algorithm collection are executed in a processing order that is dynamically generated to preserve data consistency. The evaluation may culminate in a score or similar metric assigned to Company X which may also be stored in the tier 1 database. To the extent calculation of Company X's score includes execution of multiple underlying algorithms, the results of the underlying algorithms may also be stored within the tier 1 database.

After the initial evaluation of Company X, the data harvesters may monitor their respective data sources for any changes or additions. When such a change is identified, the system generates and executes a new execution plan such that the system re-runs any algorithms that are directly or indirectly dependent on the changed data and updates entries of the tier 1 database, including Company X's score, accordingly.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 2 is a schematic illustration of a data system 200 according to an embodiment of the present disclosure. To further illustrate operations performed by the data system 200 and components thereof, reference is also made to an example method 300 for maintaining data in a data system, such as the data system 200, illustrated in FIGS. 3A and 3B and which is discussed in further detail later in this disclosure.

To provide further context to the following discussion, a basic example of a spend analysis will be used to illustrate a possible application of the systems and methods disclosed herein. In the example, a sales team for a telecommunications provider uses the system to identify potential business opportunities related to products and services offered by the telecommunications provider. The example application is intended only to illustrate systems and methods disclosed herein. Accordingly, it is not intended to limit the type of data analyzed by the data system 200, the potential applications of the data system 200, or any other similar aspect of this disclosure.

For purposes of the example, the telecommunications provider may be interested in evaluating customers based on a predicted or potential total spending on voice services as compared to an existing amount of the services currently being provided to the customer. Such services may include, without limitation, voice over Internet protocol (VoIP) services, trunking services, long distance calling, toll free calling, call center services, and other business-related telephony products and services. As a result of the analysis, the customer may be assigned a score based on, among other things, a dollar value of potential business with the customer or percentage of total spending already captured. Each customer may also be assigned a score or rank based on its relative potential as compared to other customers being monitored by the telecommunications provider.

The data system 200 facilitates consolidation and analysis of data collected from multiple data sources, such as data sources 202-208. The data sources 202-208 generally store customer information and other business-related data. The data sources 202-208 may include, without limitation, databases (such as relational databases) and flat files (such as spreadsheets). For example, one or more of the data sources 202-208 may be a data warehouse or data mart provided by a third-party and accessible through the data system 200.

Each of the data sources 202-208 communicates with a data service or application 222 through respective data harvesters 210-216. Data system 200 further includes a feedback data harvester 218 corresponding to a feedback system 240, which is discussed in more detail, below.

Each of the data harvesters 210-216 are configured to monitor, identify changes, and generate data source change notifications corresponding to a respective one of the data sources 202-208. Similarly, the feedback data source 218 is configured to monitor, identify changes, and generate data source change notifications based on modifications to a feedback database 242. For purposes of clarity, the following description refers to the data source 202 and the data harvester 210 to explain the functionality of the data harvesters within data system 200. Accordingly, and unless otherwise noted, the following description generally applies to each of data harvesters 210-216 and feedback data harvester 218.

The data harvester 210 monitors the data source 202 and identifies changes to values of one or more data fields maintained in the data source 202. In certain implementations, the data harvester 210 is configured to check for changes to the data source 202 according to a predetermined schedule (e.g., daily, weekly, monthly). In such implementations, the data harvester 210 may identify changes based on a "last updated" or similar time stamp indicating the last time data had been modified and, more particularly, whether data had been modified since the last check performed by the data harvester 210.

In the context of the example application, the telecommunications provider may implement the data system 200 in order to consolidate and analyze various customer data sources to which the provider has access. Such data sources may include those provided by third-party market data vendors but may also include internal customer data including, without limitation, sales information, billing data, contact information, product and service specifications, and any other relevant data maintained by the provider.

In response to identifying a change in the data source 202, the data harvester 210 generates a data source change notification for transmission to the data application 222. The data source change notification may include the changed data value and other identifying information including, without limitation, a field name, a field type, a field size, and a modification date/time. Generation of the data source change notification may include normalization of the data including, without limitation, changing one or more of a field length, a field type, a field name or any other data parameter such that the changed data retrieved from the data source 202 conforms to system standards.

In certain implementations, the data harvester 210 may generate data for use in the data system 200 by aggregating or otherwise performing calculations based on data of the data source 202. For example, the data source 202 may store revenue data on a monthly basis and the data harvester 210 may be configured to generate quarterly revenue data. Accordingly, the data harvester 210 may retrieve monthly revenue data for the past quarter and aggregate the monthly revenue data for transmission to the data application 222. More specifically, the data harvester 210 may retrieve monthly revenue data for the past quarter, sum the monthly revenue data, and generate a data source change notification having a quarterly revenue data field that is then transmitted to the data application 222.

In the example application, for instance, the telecommunications provider may evaluate actual spend based on internally maintained revenue data and predict spend based on the number of customer employees. In the first example, the telecommunications provider may maintain revenues for products and services sold to the customer in a data source by product/service. Accordingly, the data harvester may be configured to aggregate all revenue data associated with the customer into a single value. Similarly, the telecommunications provider may obtain employee headcount data from a third-party data vendor that maintains such data by state and may implement a data harvester adapted to collect and consolidate employee headcount data to obtain a national or region-specific number.

To the extent the data harvester 210 relies on multiple data fields of the data source 202 to derive data for use by the data system 200, the data harvester 210 may monitor each relevant data field of the data source 202 for changes and generate data source change notifications in response to changes to any of the relevant data fields. Referring to the employee headcount example, if the data source 202 includes employee headcounts on a state-by-state basis, the data harvester 210 may be configured to aggregate state employee headcounts into a national employee headcount value. The data harvester 210 may monitor each state employee headcount field of the data source 202 and generate a data source change notification when any of the state employee headcount fields changes. More specifically, in response to identifying a change in any of the state employee headcount fields, the data harvester 210 may aggregate all state employee headcount fields (including any updated fields) into a national headcount data value and generate a source data change notification including a national headcount data field with the updated value. The source data change notification may then be transmitted to the data application 222 for processing.

Figure 3A:
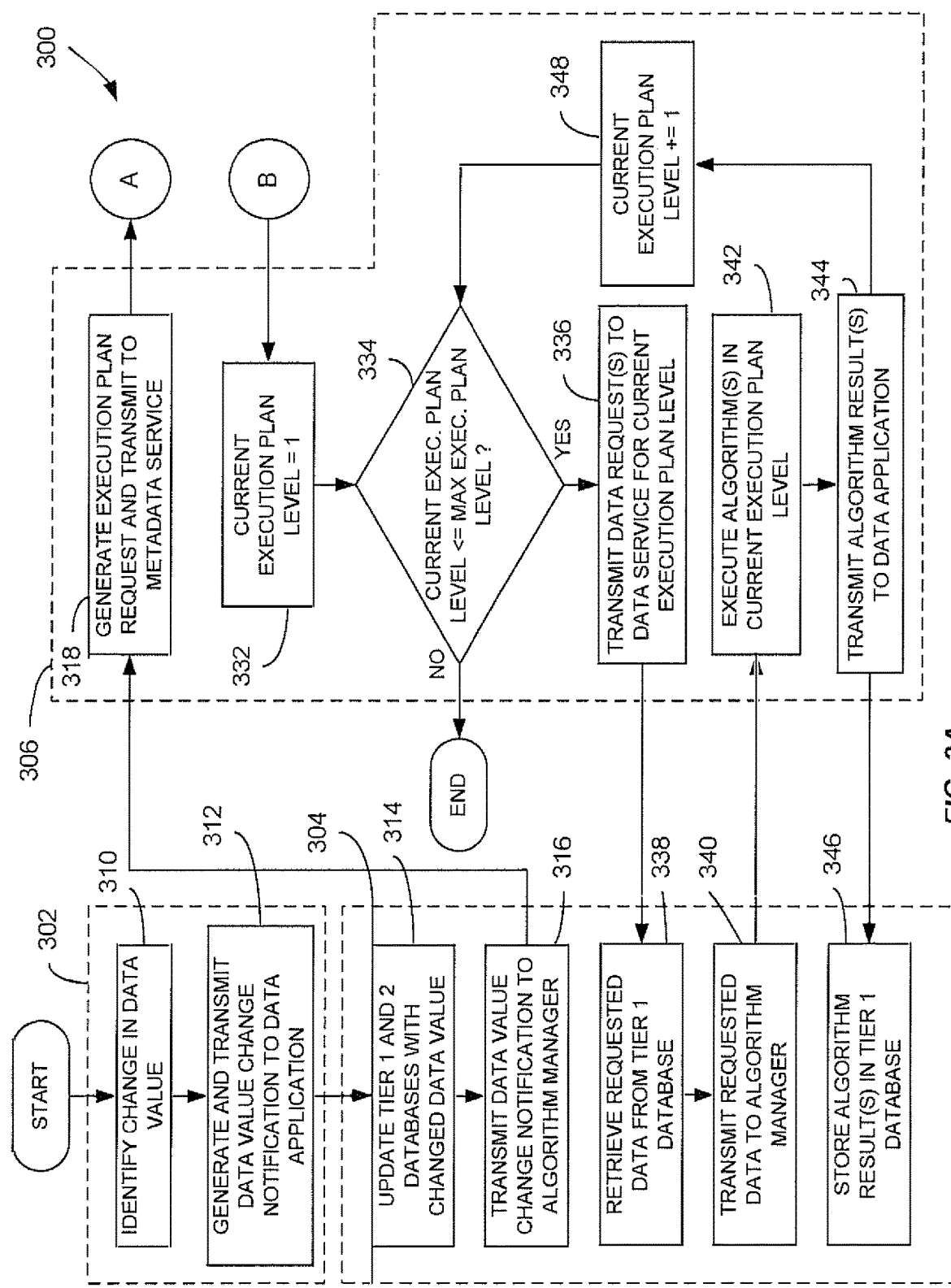
FIGS. 3A-B are a flow chart illustrating a method of maintaining customer data that may be implemented in a data system, such as the data system of FIG. 2.

The foregoing process of identify changes in data sources and generating notifications in response to such changes are generally illustrated by operations 310 and 312 of the method illustrated in FIG. 3A. Notably, because the data harvester 210 is adapted to generate and transmit change notifications only in response to changes in the data source 202, the time and bandwidth required to retrieve data from the data source 202 is significantly reduced as compared to known systems in which data is retrieved in bulk and regardless of whether the data has been modified.

Data source change notifications transmitted by the data harvesters 210-218 are received and processed by the data application 222. In certain implementations, data source change notifications are maintained in a message queue 220 and processed sequentially by the data application 222. In response to receiving a data source change notification and as illustrated by operation 314 of FIG. 3A, the data application 222 updates each of a tier 1 database 226 and a tier 2 database 224.

The tier 1 database 226 stores only the most up-to-date values of data fields relevant to customer analyses performed by the data system 200. Such data fields may include data obtained from the data sources 202-208, and 242, as well as results generated by executing various algorithms for analyzing such data, as described in more detail below. In certain implementations, the tier 1 database 226 may be a graph database that includes parallel sets of data fields and scores corresponding to each customer.

By storing current values used by the data system 200 in the tier 1 database 226, the need to retrieve data and re-execute algorithms by the data system 200 is significantly reduced. More specifically, when a change notification is received by the data application 222, the data application 222 may retrieve any unchanged data or unchanged algorithm results (i.e., results of algorithms that are not dependent on the changed data) required to propagate the changed data through the data system 200 from the tier 1 database. By doing so, the resources (e.g., bandwidth, computational power, costs, etc.) that would otherwise be consumed by retrieving the data from a corresponding data source or re-executing an algorithm are preserved and the overall time required to propagate the changed data is improved.

The tier 2 database 224 generally stores historical data regarding changes to the tier 1 database 226. Accordingly, in response to receiving a data source change notification from one of the data harvesters 210-218, the data application 222 may generate a record in the tier 2 database 224 including data and characteristics of the data source change notification. For example, in certain implementations, the data application 222 may generate a record in the tier 2 database 224 indicating one or more of an origin of the data source change notification, the updated value included in the data source change notification, the original value of the field that was changed, a date/time of the change, and any other data that may be associated with the data source change notification.

In certain implementations, the data application 222 only updates data values in the tier 1 database 226 after first determining that a data source change notification received from one of the data harvesters 210-218 actually modifies one of the data fields maintained in the tier 1 database 226. For example, the data application 222 may receive a data source change notification indicating a change in a time stamp associated with a particular data field of one of the data sources 202-208 and 242. Before modifying the tier 1 database 226, the data application 222 may first determine what change has occurred and whether the change is to an actual data value or simply to information related to the data field corresponding to the data value. To do so, the data application 222 may retrieve the most recent record associated with the data field from the tier 2 database 224 and determine what changes have actually occurred. To the extent the data value in the tier 1 database 226 has not been modified, the data application will not perform any modifications on the tier 1 database 226.

After receiving and processing a data source change notification and as illustrated by operation 316 of FIG. 3A, the data application 222 transmits a data value change notification to an algorithm manager 228. The algorithm manager 228 generally coordinates execution of one or more algorithms of an algorithm collection 230 in response to a data value change in the tier 1 database 226. Algorithms of the algorithm collection 230 may be configured to generate an output that is stored in the tier 1 database 226 and subsequently used to evaluate business opportunities. The output of an algorithm may also be used as an input to a second algorithm. As a result, an algorithm may be dependent on the result of one or more other algorithms of the algorithm collection 230. Accordingly, to maintain data consistency, the system may execute algorithms in a particular order dictated by algorithm dependencies.

In response to receiving a data value change notification and as illustrated by operation 318 of FIG. 3A, the algorithm manager 228 submits an execution plan request to an algorithm metadata service 232. The execution plan request may include, among other things, an identifier of the changed data field along with the new value or a value representative of a difference between the new value and a previous value. The algorithm metadata service 232 then generates an execution plan that provides the specific order by which algorithms of the algorithm collection 230 are to be executed in order to maintain data consistency.

To generate the execution plan, the algorithm metadata service 232 communicates with and receives data from an algorithm metadata database 234. The algorithm metadata database 234 includes entries for each algorithm of the algorithm collection 230 and their respective dependencies. A "dependency" of a given algorithm is any algorithm that requires the result of the given algorithm (or another dependent algorithm of the given algorithm) as an input. In certain implementations, entries of the algorithm metadata database 234 corresponding to a given algorithm may include a full list of dependent algorithms or may include only a first level of dependent algorithms from which a full list of dependencies may be identified by recursively traversing the metadata database 234. Similar to the tier 1 database 226, the algorithm metadata database 234 may be a graph database with each algorithm corresponding to a node in the database and each dependency corresponding to a branch between dependent algorithms. Each entry in the algorithm metadata database 234 may further include a list of data fields of the tier 1 database 226 on which the algorithm corresponding to the entry depends.

During operation, the algorithm metadata service 232 identifies algorithms affected by data changes in the data sources 202-208. More specifically, the algorithm metadata service 232 traverses the algorithm metadata database 234 using the changed data field identified in the execution plan request to identify which algorithms of the algorithm collection 230 are affected by the changed data field and the order in which the identified algorithms are to be executed to ensure data consistency. In other words, the changed data field included in the execution plan request is used as a search term or key to identify algorithms of the algorithm collection 230 that directly rely on the value stored in the changed data field. In one implementation, for example, the algorithm metadata service 232 traverses the algorithm metadata database 234 and determines the maximum depth of each algorithm affected by the data field change. To do so, the algorithm metadata service 232 may identify one or more algorithms that depend directly from the changed data field (and possibly addition data field values stored in the tier 1 database 226) and treats each such algorithm as a "root" algorithm. The depth of each algorithm that depends from the one or more root algorithms may then be ascertained. For purposes of this disclosure, the depth of an algorithm generally corresponds to the number of traversals or distance between the root algorithm and the algorithm in question. Accordingly, an algorithm that depends on data that is dependent on only the root algorithm may be assigned a depth of "1," while an algorithm that depends on data from an intermediate algorithm may be assigned a depth of "2," and so on. Certain algorithms may have multiple depth values due to multiple dependency "paths" existing between the root algorithm and the algorithm in question. In such cases, the metadata service 232 identifies the maximum depth of each algorithm.

After the maximum depth of each algorithm is ascertained, an execution plan is generated in which each algorithm having the same maximum depth is grouped in a corresponding "layer" of the execution plan. Because each layer of the execution plan includes algorithms having the same maximum depth, each algorithm within a given layer can be executed in any order, including in parallel, without compromising data consistency within the data system 200. An example process of generating an execution plan in accordance with the foregoing is illustrated by operations 320-328 of FIG. 3B. Notably, the execution plan generated by the metadata service will only include algorithms of the algorithm collection 230 that are dependent (either directly or indirectly) on the changed data identified in the execution plan request. In other words, the execution plan will exclude any algorithms of the algorithm collection 230 that are unnecessary to run to propagate the changed data through the data system 200. As a result, execution of the algorithms identified in the execution plan generally includes executing the minimum number of algorithms and consuming the least amount of computational resources required to propagate changes through the data system 200 and to update the data maintained in the tier 1 database 226.

Figure 3B:
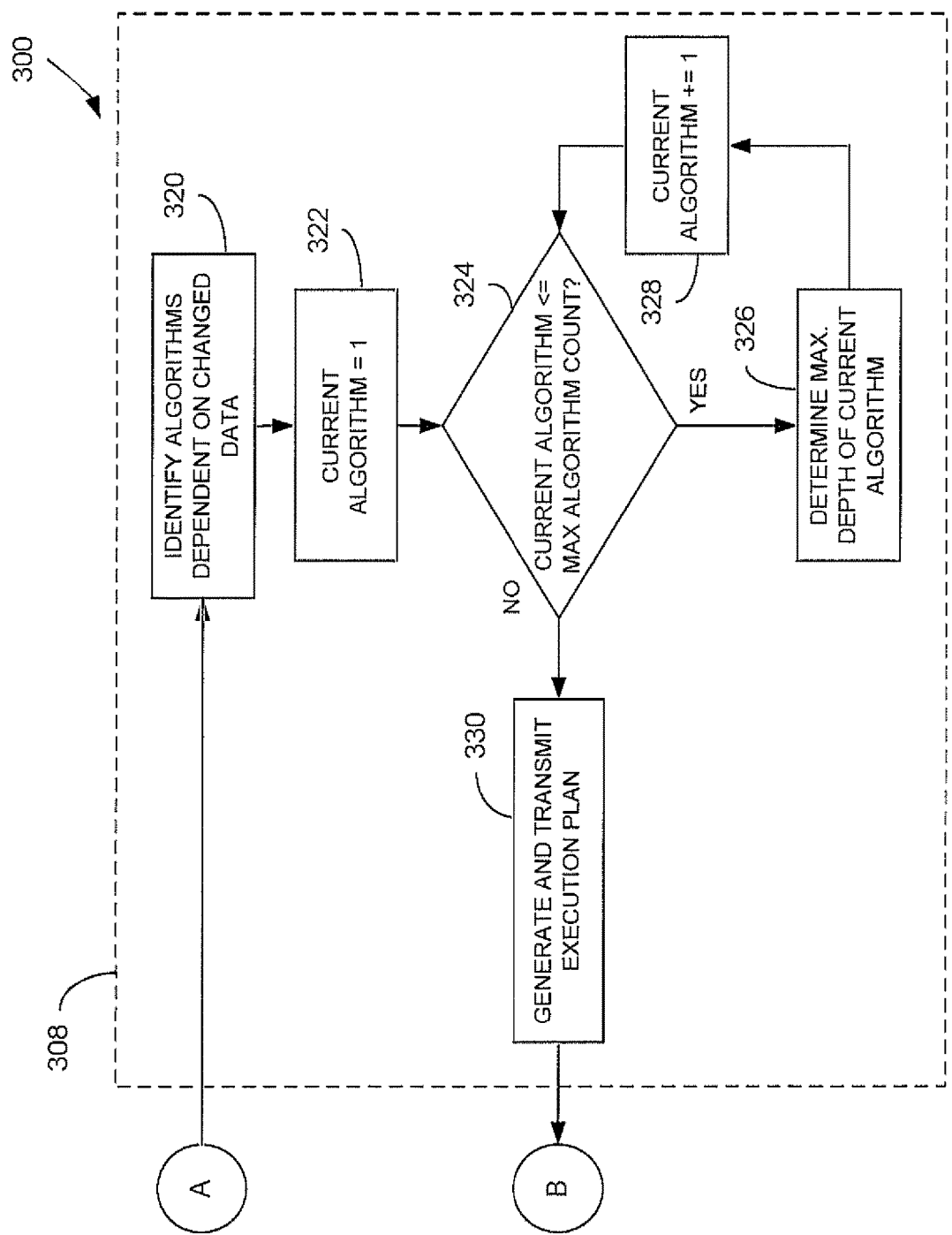

After the algorithm metadata service 232 generates an execution plan, the execution plan is sent to the algorithm manager 228 for implementation as illustrated in operation 330 of FIG. 3B. In the layered execution plan discussed above, for example, the algorithm manager 228 would execute the algorithms identified in each successive layer of the execution plan. Execution of a given algorithm generally includes the algorithm manager 228 submitting a data request to the data application 222 for any required data. The required data is generally stored in the tier 1 database 226 and, as a result, can include normalized data received from data sources (such as data sources 202-208 and feedback database 242) or scores generated by previously executed algorithms. In response to receiving the required data, the algorithm manager 228 executes the current algorithm, thereby producing a current algorithm score, and transmits the current algorithm score to the data application 222 for storage in the tier 1 database 226. The process of requesting and receiving data, executing the current algorithm, and transmitting the score generated by the current algorithm to the data application 222 for storage in the tier 1 database 226 is then repeated for each algorithm in the current layer of the execution plan.

After the algorithm manager 228 executes the algorithms in a given layer of the execution plan, the foregoing process is repeated for subsequent layers of the execution plan until all layers of the execution plan have been executed. As previously noted, each layer of the execution plan includes algorithms having the same maximum depth. By executing the execution plan in a layer-by-layer manner, data consistency is maintained because any antecedent algorithms from which a given algorithm depends are necessarily in a higher (i.e., earlier executed) layer. As a result, any antecedent algorithm outputs used as inputs by a particular algorithm are updated prior to execution of the algorithm. The general process by which the algorithm manager 228 executes the execution plan and updates the tier 1 database is illustrated in operations 332-346 of FIG. 3A.

The algorithms maintained in the algorithm collection 230 may significantly vary in complexity. Certain algorithms may perform basic mathematical operations on data stored in the tier 1 database 226. For example, referring back to the employee headcount example, data harvesters may collect employee count data for individual customer sites and a "total employee count" algorithm may simply add together the separate employee counts to generate the total number of customer employees. The total number of customer employees may then be used as an input to other algorithms. Algorithms may also correspond to predictive mathematical models. The telecommunications provider of the example application, for instance, may develop one or more algorithms for predicting a total spend of a customer. Such a model may be a basic linear model that multiplies the number of customer employees by a predetermined spend per employee value to obtain a customer's total spend or may include a more complicated, multi-variable model that takes into account other parameters including, without limitation, parameters related to the customer, the industry in which the customer operates, and behavior of similar customers. Notably, individual coefficients and values used by an algorithm of the algorithm collection may in turn be the result of other algorithms of the algorithm collection. For example, the previously discussed linear model for total customer spend may receive inputs from a first algorithm that calculates a total employee headcount and a second algorithm that determines average spend per employee for the industry in which the customer operates.

The data system 200 further includes a user interface 236 for accessing the data system 200. The user interface 236 may be implemented as a web portal, an application, or similar software and enables a user of the user interface 236 to perform various tasks associated with the data system 200. For example, the user interface 236 may be configured to access one or more services 238 for accessing data of the consumer data system 200, performing analytics, performing maintenance and/or troubleshooting operations, and the like. The services 238 also provide a primary integration point for any external systems that may communicate with the consumer data system 200.

As a first example, the user interface 236 facilitates analysis and maintenance of the data system 200. For example, an information technology group of an organization may access the data system 200 through the user interface 236 to update data stored in one or more of the tier 2 database 224 and the tier 1 database 226. The user interface 236 may also be used to add to, delete from, or otherwise modify the algorithm collection 230 and to make any corresponding changes to the algorithm metadata database 234.

As another example, the user interface 236 may be used by a salesperson or similar user to access data and identify potential business opportunities. For example, in some implementations the user interface 236 accepts an inquiry from the user regarding a particular business opportunity and presents the user with a score or similar metric corresponding to the relative strength of the opportunity. The user interface 236 may further provide any other information stored or otherwise derived from data stored in the tier 2 database 224 and/or the tier 1 database 226 related to the business opportunity or to its scoring.

In certain implementations, the user interface 236 may allow a user to drill down into data underlying a particular customer score. To the extent the user identifies an error in the data, has more recent data, or is otherwise aware of a discrepancy between the data stored in the data system 200 and actual metrics regarding a given customer, the user can submit feedback to a feedback system 240. The feedback system 240 generally provides a mechanism for receiving, evaluating, and implementing changes to data of the consumer data system 200 based on user feedback. Accordingly, the feedback system 240 receives feedback notifications from the user interface 236 and implements a workflow applicable to the given feedback notification. For example, the feedback system automatically determines whether particular feedback from the user interface 236 should be automatically accepted, rejected, or subjected to further review, such as by generating a ticket or similar notification for follow up.

In certain implementations, feedback notifications are stored in a feedback database 242 which is in communication with a feedback data harvester 218. Similar to data harvesters 210-216, the feedback data harvester 218 monitors the feedback database 242 for any feedback that includes a modification to one or more data values maintained in the tier 1 database 226. When such feedback is received, the feedback data harvester 218 normalizes the feedback data and transmits a feedback notification to the data application 222 via the message queue 220. The data application 222 then processes the feedback notification by adding the feedback data to the tier 1 database 226 and transmits a corresponding data value change notification to the algorithm manager 228. The algorithm manager 228 then proceeds with obtaining and executing a corresponding execution plan in order to propagate any changes resulting from the feedback through the consumer data system 200.

In certain implementations, data value changes received as feedback are directly used as inputs to algorithms during execution. In other examples, data value changes received as feedback are used to weigh or otherwise modify existing values for the given data value previously obtained from one of the data sources 202-208 and already stored in the tier 1 database 226. For example, a user may notice that the consumer data system 200 believes a company headcount to be 475 employees while the user has reliable information that the headcount is actually 575. The user may then provide corresponding feedback via the user interface 236 indicating the discrepancy. During propagation of the subsequent update to the headcount value, the algorithm manager 228 coordinates execution of algorithms of the algorithm collection 230 which require headcount as an input. Accordingly, the algorithm manager 228 may be configured to provide the feedback value (575) or some combination of the current tier 1 value (475) and the feedback value. For example, the algorithm manager may use an average of the feedback value and the current tier 1 value, a weighted average of the feedback value and the current tier 1 value, or any similar combination of the feedback value and the current tier 1 value as input to a given algorithm. In implementations in which a weighted average or similar weighted combination is used, the weightings assigned to each of the feedback value and the tier 1 value may vary over time. For example, a feedback value may initially be assigned a 50% weighting that gradually decreases over time until only the current tier 1 value is used.

The process of retrieving and combining a feedback value and a current tier 1 value can also be triggered by modification of a data value other than that corresponding to the feedback value. For example, an algorithm that determines average spend per employee may require each of a total spend value and a total employee headcount value as inputs. If the total spend value is later modified, the average spend per employee algorithm would be executed as described herein. If feedback had been previously provided regarding the total employee value, the algorithm manager 228 would retrieve the updated total spend value as well as each of the current tier 1 employee count value and the feedback employee count value. The employee count values may then be combined as previously discussed to generate an input for the algorithm.

FIGS. 3A-3B depict a flow chart illustrating an example method 300 for maintaining customer data in a data system, such as the data system 200 of FIG. 2. With reference to the computer data system 200 of FIG. 2, FIGS. 3A-3B include boxes 302, 304, 306, and 308, which correspond to elements of the data system 200 and contain flow chart elements corresponding to operations that may be executed by the elements. In the example method 300, box 302 corresponds to the data harvester 210, box 304 corresponds to the data application 222, box 304 corresponds to the algorithm manager 228, and box 306 corresponds to the algorithm metadata service 232.

Referring first to box 302, the data harvester 210 identifies a change to a data value in a corresponding data source, such as the data source 202 of FIG. 2 (operation 310). In response to identifying the change in the data value, the data harvester 210 generates a data source change notification and transmits the data source change notification to the data application 222 (operation 312). The data source change notification generally includes at least a data field or identifier for a data field corresponding to the changed data value of the data source 202 as well as the new data value itself. In certain implementations, the process of generating the data source change notification may include normalizing the data, such as by reformatting the data or aggregating multiple data fields of the data source 202 into a single value.

In response to receiving a data source change notification, the data application 222 updates each of the tier 2 database 224 and the tier 1 database 226 with the changed data value (operation 314). For example, the data application 222 adds a record to the tier 2 database 224 corresponding to the data source change notification. The record added to the tier 2 database 224 may include, without limitation, the data field changed, a timestamp associated with receipt of the change, the source of the data source change notification, the changed data source, and similar information regarding the data. With respect to the tier 1 database 226, the data application 222 adds or updates a value of the tier 1 database 226 corresponding to the data field of the data source 202 to reflect the change. The tier 1 database 226 is preferably maintained as a graph database that contains only the most current data values for data used by algorithms of the data system 200. In implementations in which algorithms are dependent on each other, the tier 1 database 226 may also store scores or other results of algorithms that may be used as inputs for dependent algorithms.

After the tier 2 database 224 and the tier 1 database 226 have been updated, the data application 222 generates a data value change notification and transmits the data value change notification to the algorithm manager 228 (operation 316). The data value change notification includes the data field or a corresponding identifier of the data field that was changed. In response to receiving the data value change notification, the algorithm manager 228 generates and transmits an execution plan containing the changed data field to the algorithm metadata service 232 (operation 318; box 308, which corresponds to the algorithm metadata service 232, is shown in FIG. 3B).

The algorithm metadata service 232 is configured to identify all algorithms dependent, either directly or indirectly, on the changed data. More specifically, the algorithm metadata service 232 is in communication with an algorithm metadata database 234 that contains information regarding the inputs and dependencies of each algorithm of an algorithm collection 230 used by the data system 200 to evaluate business opportunities. The algorithm metadata database 234 is preferably a graph database with each node corresponding to an algorithm of the algorithm collection 230 and each branch representing dependencies between the algorithms.

When the algorithm metadata service 232 receives the execution plan request, it identifies each algorithm that would be affected by a change to the data field included in the execution plan request. More specifically, the algorithm metadata service 232 uses the data field to identify each algorithm of the algorithm collection 230 that depends directly on the data field and traverses the algorithm metadata database 234 to identify all other dependent algorithms (operation 320). After all relevant algorithms have been identified the algorithm metadata service 232 determines the order in which the relevant algorithms are to be executed. In the method 300, for example, the algorithm metadata service 232 determines the maximum depth of each relevant algorithm. To do so, the algorithm metadata service 232 may initialize an index corresponding to a current algorithm (operation 322) and execute a loop in which it is determined if the current index exceeds the maximum algorithm count (operation 324) and, if not, the maximum depth of the current algorithm is determined (operation 326) and the index is incremented (operation 328). After the algorithm metadata service 232 determines the depth of each algorithm, it generates an execution plan and transmits the execution plan back to the algorithm manager 228 (operation 330). In implementations in which the depth of each relevant algorithm is used to determine execution order, for example, the execution plan generated by the algorithm metadata service 232 includes multiple layers, each of which includes references to algorithms having the same maximum depth. To maintain data consistency, the layers are executed successively from shallowest to deepest depth where execution of a given layer entails executing each algorithm within the layer. Notably, because the algorithms within a given layer are not dependent on each other, they may be executed in series or in parallel without affecting data consistency.

Referring back to FIG. 3A, the algorithm manager 306 receives and executes the execution plan (illustrated as a loop including operations 332-348). For example, in the method 300, an index is initialized to track the current layer of the execution plan (operation 332). A check is then performed to determine whether the current execution plan level exceeds the maximum execution plan level (operation 334). If not, the algorithm manager 306 transmits one or more data requests to the data application 222 for data required by the algorithms of the execution layer (operation 336). The data application 222 retrieves the requested data from the tier 1 database 226 and transmits the data to the algorithm manager 228 (operations 338 and 340, respectively). In response to receiving the requested data, the algorithm manager 228 coordinates execution of each algorithm within the current execution plan layer using the retrieved data (operation 342) and transmits the results of executing the algorithms to the data application 222 (operation 344) for storage in the tier 1 database 226 (operations 346). The execution plan layer index is then incremented (operation 348) and the process of retrieving data for the current execution plan layer, executing the algorithms of the current execution plan layer, and storing the corresponding results is then repeated for the next layer of the execution plan.

Figure 4:
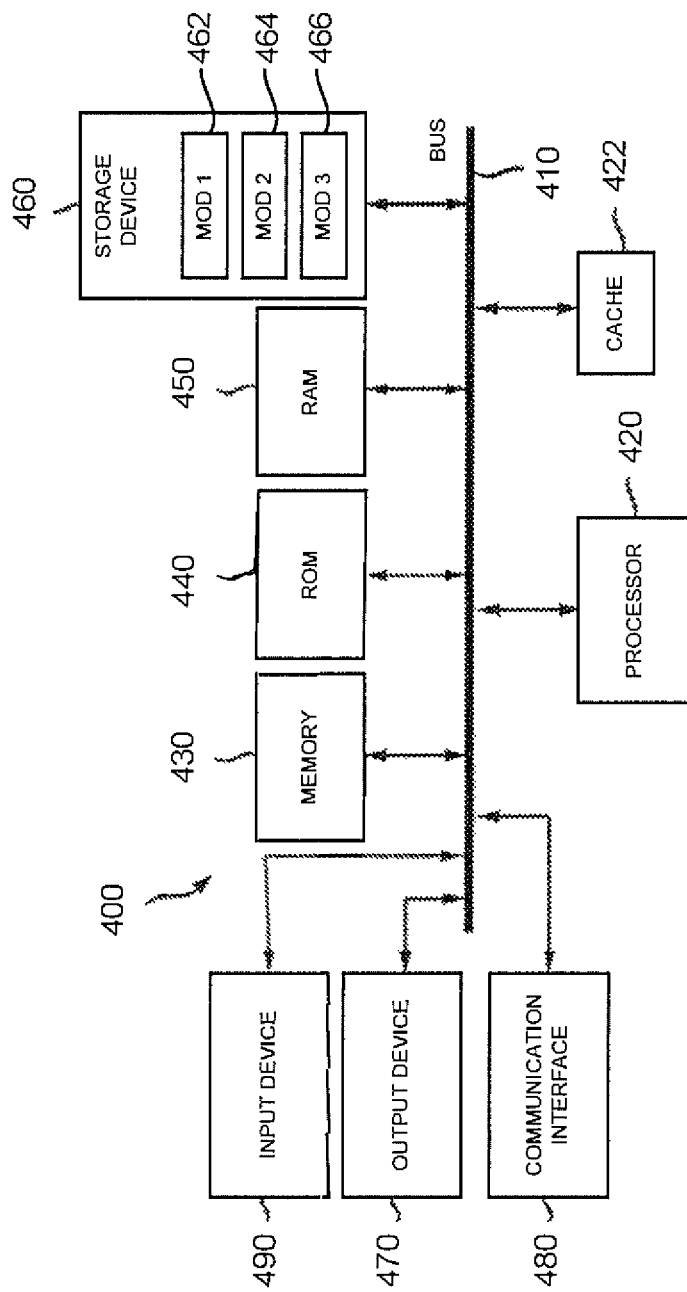
FIG. 4 is an example computing system that may implement various systems and methods of the presently disclosed technology.

With reference to FIG. 4, an exemplary system includes a general-purpose computing device 400 including a processing unit (CPU or processor) 420 and a system bus 410 that couples various system components including the system memory 430 such as read only memory (ROM) 440 and random access memory (RAM) 450 to the processor 420. The system 400 can include a cache 422 of high speed memory connected directly with, in close proximity to, or integrated as part of the processor 420. The system 400 copies data from the memory 430 and/or the storage device 460 to the cache 422 for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 420. The functions these blocks represent may be provided through the use of either shared or dedicated hardware, including, but not limited to, hardware capable of executing software and hardware, such as a processor 420, that is purpose-built to operate as an equivalent to software executing on a general purpose processor. For example the functions of one or more processors presented in FIG. 4 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 440 for storing software performing the operations described below, and random access memory (RAM) 450 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 400 shown in FIG. 4 can practice all or part of the recited methods, can be a part of the recited systems, and/or can operate according to instructions in the recited tangible computer-readable storage media. Such logical operations can be implemented as modules configured to control the processor 420 to perform particular functions according to the programming of the module. For example, FIG. 4 illustrates three modules Mod1 462, Mod2 464 and Mod3 466 which are modules configured to control the processor 420. These modules may be stored on the storage device 460 and loaded into RAM 450 or memory 430 at runtime or may be stored in other computer-readable memory locations.

Where business-related numbers are used in the attached figures or within this disclosure (i.e., amounts received, revenues, number of tickets, prices, number of sites, standard deviations, etc.), such numbers are provided as non-limiting examples. In other circumstances the types of values, how the numbers are used by various analyses, as well as the amounts of the values, can vary.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

We claim:

1. A method of updating and analyzing data in a data system comprising:
   receiving a change notification indicating a change to a field of a data source;
   updating a database value of a first database in response to receiving the change notification;
   identifying a dependency graph indicative of a first dependency of a first algorithm on the updated database value and of a second dependency of a second algorithm on the first algorithm;
   identifying, based on the dependency graph, the first algorithm and the second algorithm, wherein identifying the first algorithm and the second algorithm comprises:
   transmitting a request including an identifier corresponding to the database value; and
   receiving an execution order in response to the request, the execution order indicating an order in which to execute the first algorithm and the second algorithm; and
   generating an algorithm result of the second algorithm by executing each of the first algorithm and the second algorithm in accordance with the execution order; and
   storing the algorithm result in the first database.

2. The method of claim 1, wherein the first algorithm is at least one of directly dependent on the database value such that the first algorithm uses the database value as an input and indirectly dependent on the database value such that the first algorithm uses an output of another algorithm dependent on the database value as an input.

3. The method of claim 1, further comprising storing a result of the first algorithm in the first database.

4. The method of claim 1, wherein transmitting the request comprises transmitting the request to an application in communication with a second database including dependency data for a plurality of algorithms including the first algorithm and the second algorithm, the dependency data indicating inputs required for each algorithm of the plurality of algorithms.

5. The method of claim 4, wherein the second database is a graph database.

6. The method of claim 1, wherein the first database is a graph database.

7. The method of claim 1, wherein the change notification is received from an application in communication with the data source, the application configured to retrieve and normalize data obtained from the data source and to generate and transmit the change notification in response to identifying changes to the data source.

8. The method of claim 1, further comprising receiving a feedback value corresponding to but different than the database value, wherein generating the algorithm result comprises providing an input value to the first algorithm, the input value being one of the feedback value and a combination of the database value and the feedback value.

9. The method of claim 8, wherein the input value is a combination of the database value and the feedback value, and the input value is one of an average of the database value and the feedback value, a weighted average of the database value and the feedback value, and a time-dependent weighted average of the database value and the feedback value.

10. The method of claim 8, further comprising storing the feedback value in the first database.

11. The method of claim 1, wherein the algorithm result includes a scoring metric.

12. The method of claim 1, wherein the first algorithm and the second algorithm are included in an algorithm collection including a plurality of algorithms, the method further comprising:
   modifying the algorithm collection by modifying an existing algorithm of the algorithm collection and adding a new algorithm to the algorithm collection;
   executing each algorithm of the algorithm collection dependent on the modified existing algorithm and the new algorithm, respectively.

13. The method of claim 1, wherein the execution order is generated by:
   identifying the first algorithm from a plurality of algorithms that are dependent on the database value;
   assigning the first algorithm to a first execution layer of the execution order;
   identifying the second algorithm from the plurality of algorithms by traversing a dependency graph including dependency data for the plurality of algorithms; and
   assigning the second algorithm to a second execution layer of the execution order according to a traversal distance of the second algorithm from the first algorithm,
   wherein executing the first algorithm and the second algorithm in accordance with the execution order the first execution layer followed by executing the second execution layer.

14. A system for organizing and analyzing data from multiple data sources comprising:
   an algorithm collection including a plurality of executable algorithms for evaluating data; and
   a first database including dependency data for each algorithm of the plurality of algorithms; and one or more computing devices configured to:
   receive a notification corresponding to changed data of a data source;
   identify, based on the first database, a first algorithm and a second algorithm of the algorithm collection, wherein the first algorithm is dependent on the changed data, and wherein the second algorithm is dependent on the first algorithm;
   execute the first algorithm and the second algorithm according to an execution order derived from the dependency data; and
   update a second database to include a result of the second algorithm.

15. The system of claim 14, wherein at least one of the first database and the second database are graph databases.

16. The system of claim 14, wherein the one or more computing devices are further configured to receive the notification from a data harvesting application adapted to retrieve and normalize data from the data source.

17. The system of claim 16, wherein the data harvesting application is one of a plurality of data harvesting applications and each data harvesting application of the plurality of data harvesting applications adapted to retrieve and normalize data from a respective data source, the one or more computing devices further configured to receive notifications from each of the plurality of data harvesting applications.

18. The system of claim 17, wherein the one or more computing devices are further configured to:
receive an execution plan including an execution order for the first algorithm and the second algorithm,
wherein executing the first algorithm and the second algorithm includes executing the first algorithm and the second algorithm according to the execution order.

19. The system of claim 18, wherein the one or more computing devices are further configured to:
generate, in response to receiving the notification, a request for an execution plan; and
transmit the request to an application in communication with the first database, the application adapted to generate the execution plan.

20. The system of claim 14, wherein the one or more computing devices are further configured to generate log entries corresponding to data received and analyzed by the one or more computing devices and to store the log entries in a third database.

21. The system of claim 14, further comprising a third database adapted to store feedback data corresponding to data stored in the second database, wherein the one or more computing devices are further configured to execute the first algorithm using the feedback data.

22. A system for organizing and analyzing data from multiple data sources comprising:
an algorithm collection including a plurality of executable algorithms;
a dependency database including dependency data for each algorithm of the algorithm collection, the dependency data indicating data relationships between algorithms of the algorithm collection;
a current database including current values of data stored in one or more data sources and results of algorithms of the algorithm collection; and
one or more computing devices communicatively coupled to the algorithm collection, the dependency database, and the current database, the one or more computing devices configured to:
recognize a change to data of the one or more data sources;
identify, based on the dependency database, a first algorithm and a second algorithm of the algorithm collection, wherein the first algorithm is dependent on the changed data, and wherein the second algorithm is dependent on the first algorithm;
generate, based on the dependency data, an execution order for the first algorithm and the second algorithm;
generate an algorithm result by executing the first algorithm and the second algorithm according to the execution order; and
update the database to include the algorithm result.

* * * * *